April 22, 1941.  H. J. CRINER  2,239,167
HYDRAULIC CLUTCHING AND DRIVING APPARATUS
Filed July 10, 1940
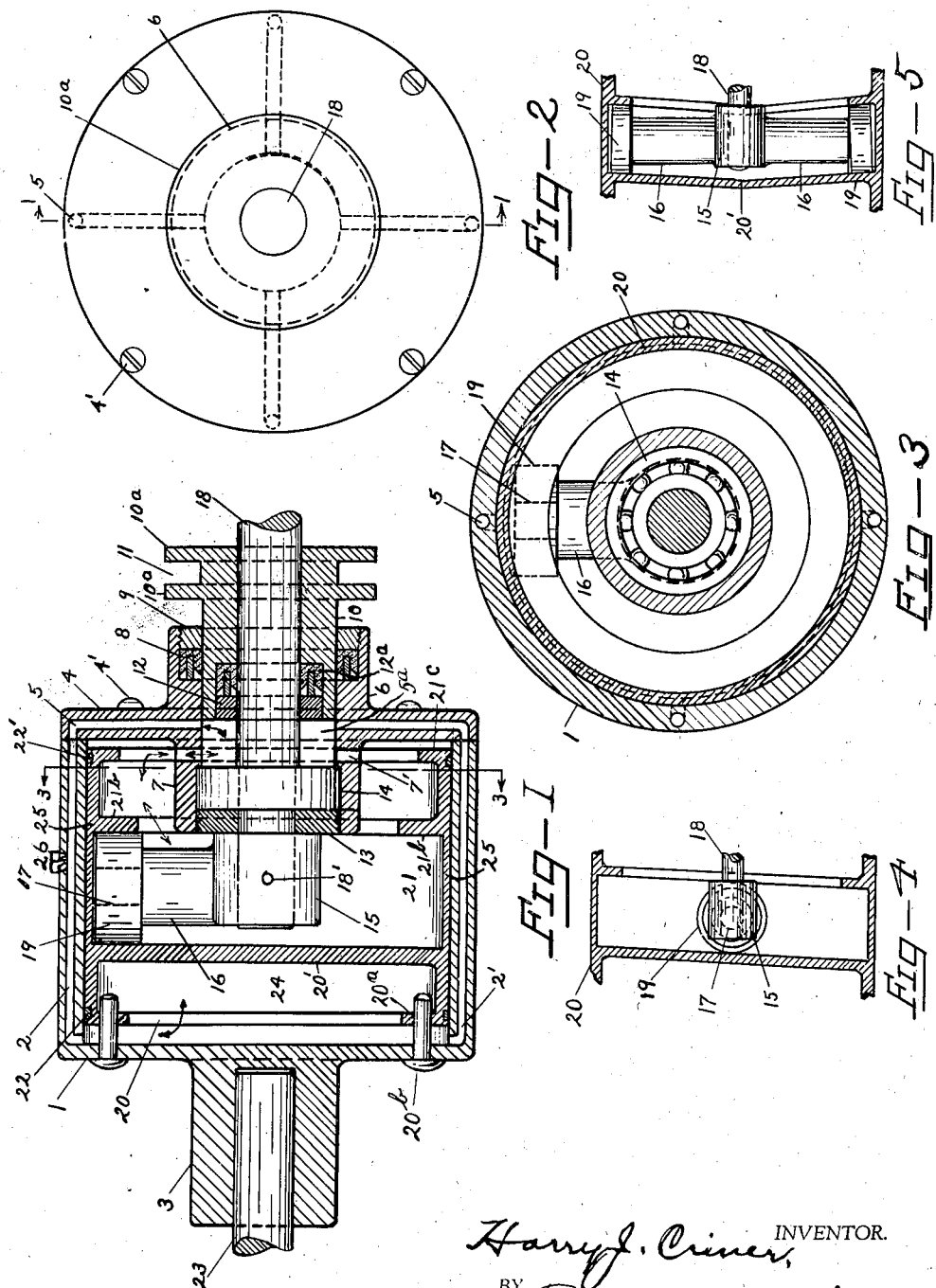
INVENTOR.
Harry J. Criner,
BY
Bush & Bush
ATTORNEYS.

Patented Apr. 22, 1941

2,239,167

UNITED STATES PATENT OFFICE 2,239,167

HYDRAULIC CLUTCHING AND DRIVING APPARATUS

Harry J. Criner, Davenport, Iowa, assignor of one-half to A. G. Bush, Davenport, Iowa Application July 10, 1940, Serial No. 344,664

10 Claims. (Cl. 192—59)

My invention relates to improvements in hydraulic clutching and driving apparatus.

The objects of my invention are to provide a simple, efficient, fluid-actuated clutching mechanism adapted to transmit power from a driving shaft to a driven shaft at variable relative speeds ranging from direct drive and uniform speed, to complete idling of the driven shaft.

I accomplish these objects by the means illustrated in the accompanying drawing, in which, Figure 1 is a longitudinal section of my apparatus on the line 1—1 of Figure 2;

Figure 2 is a front elevation referring to the right end of Figure 1 as the front;

Figure 3 is a cross-sectional view on the line 3—3 of Figure 1;

Figure 4 is a detail showing an exaggerated angle of the crank chamber;

Figure 5 is an alternate form of crank and crank chamber showing two oppositely positioned cranks in place of the single one shown in Figure 1.

Similar numerals refer to similar parts throughout the several views.

My apparatus includes a driving shaft 18 which may be the engine shaft of an automobile, airplane or other machine of any kind, and a driven shaft 23 which may be the propeller shaft of an automobile, airplane, lathe, or other machine.

The driven shaft 23 has rigidly mounted thereon a hub 3 formed integral with the cylindrical housing 1, the opposite end of which is fitted with a cover plate 4 which may be secured to the side walls of the housing 1 by set screws or stud bolts 4' or other suitable means.

The cover plate 4 has an external hub 6 formed integral therewith and an internal hub 7. Within the hub 6 and upon the driving shaft 18 is slidably mounted a sleeve 10, the inner end of which is bored out and threaded internally to receive a ring 12 which bears against and holds in place an internal packing ring 12a which may be of any suitable form or material adapted for that purpose.

The outer end of the hub 6 is bored out and internally threaded to receive a ring 9 adapted to bear against and hold in place an outer oil seal packing ring 8 of any suitable form or material. Such packing rings being in common use and well known, I make no claim to any precise kind of material or form of ring.

In the outer walls of the housing 1 ports 2 and 2' are bored which form conduits adapted to carry the oil from the rear pressure chamber 24 to the front pressure chamber 21 by way of intermediate ports 5 formed in the cover plate 4 and the oil space 5a surrounding the shaft 18 and through the ports 7' formed in the inner hub 7.

A ball bearing 14 is mounted within the inner hub 7 to form an inner bearing for the shaft 18 and a threaded ring 13 mounted in the inner end of the hub 7 to retain the bearing 14 in place.

Upon the inner end of the shaft 18 a hub 15 is mounted which may be secured in place by a key or pin 18' or other suitable means, or it may be provided with grooves and ribs to mesh with similar ribs and grooves on the shaft 18.

An arm 16 is formed integral with the hub 15 carrying a trunnion 17 with a ball-bearing roll 19 mounted thereon. The ball-bearing 19 is of the self-aligning type which will permit angular movement thereof relative to the trunnion 17, to adapt it to travel on the angular flange 21b and transverse wall 20'.

The front pressure chamber 21 is formed with a solid rear wall 20' which stands at a slight angle to the rear head of the housing 1 and is united all the way around to the cylindrical walls of the piston 25.

A similarly inclined wall 21b is formed spaced from and parallel to the wall 20' but with its central portion cut away to permit the entrance of the hub 7, and a front inwardly turned annular flange 21c may be formed integral with the side walls of the piston 25 to strengthen and balance a similar flange 20 formed at the rear end of the piston.

The piston 25 is fitted to the inner walls of the housing 1 so as to permit free longitudinal movement therein. Annular rear flange 20 is formed integral with the walls of the piston 25 and provided with bores 20a adapted to receive and slide lengthwise upon guide bolts 20b or other suitable guide rods united to the rear head of the housing 1 while permitting free longitudinal movement thereof within given limits. Packing rings 22 and 22' are mounted upon the periphery of the piston 25.

The direction of the flow of the oil during the reciprocating motion of the piston is indicated by the double pointed arrows as it passes to or from the front pressure chamber 21 to or from the rear pressure chamber 24.

A collar 10a is formed integral with the sleeve 10 carrying a groove 11 in which a fork or yoke or other actuating means may be mounted to move the sleeve 10 inwardly so as to close the inner ends of the ports 5. As such devices are well known and in common use, I do not attempt to show the actuating lever and fork or yoke, but any desired form of apparatus may be employed to cause the sleeve 10 to travel so as to close or open the ports 5.

Any desired plurality of ports 5 may be utilized and the longitudinal movement of the sleeve 10 may be very small.

In Figure 5 I have shown a sectional detail of an alternative form of apparatus employing a plurality of arms 16 and bearings 19. In this form the crank chamber has its side walls inclined so as to cause two longitudinal movements in both directions of the piston 25 for each revolution of the shaft 18. Obviously three or four, or even more, arms 16 and bearings 19 may be utilized and the contour of the inner faces of the rear wall 20' may be varied to cause a corresponding number of longitudinal movements of the piston 25 for each revolution of the driving shaft 18.

In the operation of my apparatus the pressure chambers 24 and 21 may be filled with oil through an opening in the housing which may be closed by a filler plug 26. The sleeve 10 is then thrown into the position shown in Figure 1 leaving the ports open so that the oil can travel freely back and forth between the pressure chambers 21 and 24. Obviously the oil will not be subject to any appreciable compression and when it is desired to operate the driven shaft 23, the sleeve 10 will be moved inwardly so as to gradually close the ports 5, thereby preventing any movement of the oil from one pressure chamber to the other. As the oil cannot move from one chamber to the other when the ports are closed, the piston 25 cannot travel longitudinally of the shafts and will lock the crank 16 against rotation relative to the piston 25, thus compelling the driven shaft 23 to turn with the driving shaft 18. When the ports are entirely closed, the driven shaft 23 will travel in what is called direct drive and will revolve at the same rate as the shaft 18.

When it is desired to vary the relative speed of the driving shaft 18 and the driven shaft 23 but to keep the driven shaft 23 in motion, the sleeve 10 may be moved far enough to partially open the ports 5 so as to permit the desired amount of travel of the oil from one pressure chamber to the other and in order to safeguard the apparatus against injury in case a vehicle driven thereby should run against an immovable obstruction, it is advisable to place the sleeve 10, even when utilizing direct drive, in such a position that a slight opening is left for the travel of the oil from one chamber to the other whereby the shock of a sudden stoppage of the propeller shaft would be cushioned to some extent.

While I have shown the guide bolts 20b to present relative rotation of the piston 25 and the housing 1, it is obvious that splines, keys or various other suitable devices may be used for that purpose.

As various modifications of my apparatus may be made without departing from the spirit of my invention, I do not limit my claims to the precise forms shown in the drawing.

I claim:

1. A hydraulic clutch comprising a cylindrical housing united to a driven shaft, an open-ended cylindrical piston mounted therein for longitudinal travel but secured against rotation relative to the housing, a transverse wall formed in the piston to separate front and rear fluid-chambers, a driving shaft revolvably mounted in one end of the housing in line axially with the driven shaft and with its inner end extending into the front fluid-chamber, an annular flange formed integral with the piston spaced in front of and parallel to the transverse wall, a crank united to the inner end of the driving shaft carrying a trunnion with a self-aligning ball-bearing roll mounted thereon to contact and roll between and along the transverse wall and flange adjacent the side walls of the piston during rotation of the driving shaft relative to the piston, the transverse wall and the flange being formed at an angle to the plane of revolution of the crank whereby the piston will be caused to travel longitudinally as the crank revolves with the driving shaft when the ports hereafter mentioned are open, ports leading from one compression chamber to the other, and means for closing the ports to prevent movement of fluid from either chamber to the other thereby causing the piston and housing to revolve with the drive shaft.

2. A hydraulic clutch comprising a cylindrical housing united to a driven shaft, an open-ended cylindrical piston mounted therein for longitudinal travel but secured against rotation relative to the housing, a transverse wall formed in the piston to separate front and rear fluid-chambers, a driving shaft revolvably mounted in one end of the housing in line axially with the driven shaft and with its inner end extending into the front fluid-chamber, an annular flange formed integral with the piston spaced in front of and parallel to the transverse wall, a crank united to the inner end of the driving shaft carrying a self-aligning roll mounted thereon to contact and roll between and along the transverse wall and flange during rotation of the driving shaft relative to the piston, the transverse wall and the flange being formed at an angle to the plane of revolution of the crank whereby the piston will be caused to travel longitudinally as the crank revolves with the driving shaft when the ports hereafter mentioned are open, ports leading from one compression chamber to the other, and means for closing the ports to prevent movement of fluid from either chamber to the other thereby causing the piston and housing to revolve with the drive shaft.

3. A hydraulic clutch comprising a cylindrical housing closed at both ends and rigidly united to a co-axial driven shaft, an open-ended cylindrical piston mounted for longitudinal travel therein but secured against rotation relative to the housing having an intermediate transverse wall and an annular flange united to the piston spaced from the transverse wall and parallel thereto, fluid chambers formed on the front and rear sides of the transverse wall bounded on the sides by the side walls of the cylinder and piston and bounded on the ends by the end walls of the cylinder and the intermediate wall of the piston, a driving shaft revolvably mounted in the front end of the housing with its inner end extending into the front chamber, a crank united to the inner end of the driving shaft carrying a roll mounted thereon whereby it may contact and roll upon the transverse wall and the annular flange during the rotation of the driving shaft relative to the piston, the transverse wall and the flange being formed at an angle to the plane of the crank whereby the piston will be caused to travel longitudinally as the crank revolves with the driving shaft.

4. A hydraulic clutch comprising a cylindrical housing closed at both ends and rigidly united to a co-axial driven shaft, an open-ended cylindrical piston mounted for longitudinal travel therein but secured against rotation relative to the housing having an intermediate transverse wall and an annular flange united to the piston spaced from the transverse wall and parallel thereto, fluid chambers formed on the front and rear sides of the transverse wall bounded on the sides by the side walls of the cylinder and piston and bounded on the ends by the end walls of the cylinder and the intermediate wall of the piston, a driving shaft revolvably mounted in the front end of the housing with its inner end extending into the front chamber, a crank united to the inner end of the driving shaft carrying a self-aligning ball-bearing roll mounted thereon whereby it may contact and roll upon the transverse wall and the annular flange during the rotation of the driving shaft relative to the piston, the transverse wall and the flange being formed at an angle to the plane of the crank whereby the piston will be caused to travel longitudinally as the crank revolves with the driving shaft.

5. A hydraulic clutch comprising a cylindrical housing united to a driven shaft, an open-ended cylindrical piston mounted therein for longitudinal travel but secured against rotation relative to the housing, a transverse wall formed in the piston to separate front and rear fluid-chambers, a driving shaft revolvably mounted in one end of the housing in line axially with the driven shaft and with its inner end extending into the front fluid-chamber, an annular flange formed integral with the piston spaced in front of and parallel to the transverse wall, a crank united to the inner end of the driving shaft carrying a trunnion with a self-aligning ball-bearing roll mounted thereon to contact and roll between and along the transverse wall and flange adjacent the side walls of the piston, during rotation of the driving shaft relative to the piston, the transverse wall and the flange being formed at an angle to the plane of revolution of the crank whereby the piston will be caused to travel longitudinally as the crank revolves with the driving shaft when the ports hereafter mentioned are open, ports in the cylinder leading from one compression chamber to the other, and means for closing the ports to prevent movement of fluid from either chamber to the other thereby causing the piston and housing to revolve with the drive shaft.

6. In a hydraulic clutch, a closed cylindrical housing united to a driven shaft, a piston comprising a transverse body wall united to a cylinder extending to the front and rear and slidable in the housing for longitudinal travel but secured against rotation relative to the housing, fluid-chambers on each side of the piston wall, a driving shaft revolvably mounted in the housing with its inner end extending into the front fluid-chamber, an annular flange united to the piston spaced from the transverse wall and parallel thereto, a crank united to the inner end of the driving shaft carrying a trunnion with a self-aligning roll mounted thereon whereby it may contact and roll upon the transverse wall and the annular flange adjacent the side walls of the piston during the rotation of the driving shaft relative to the piston and may bear against and rotate same when the piston is locked against longitudinal movement, the transverse wall and the flange being formed at an angle to the plane of the crank whereby the piston will be caused to travel longitudinally as the crank revolves with the driving shaft relative to the housing.

7. A hydraulic clutch comprising a cylindrical housing united to a driven shaft, an open-ended cylindrical piston mounted therein for longitudinal travel but secured against rotation relative to the housing, a transverse wall formed in the piston to separate front and rear fluid-chambers, a driving shaft revolvably mounted in one end of the housing in line axially with the driven shaft and with its inner end extending into the front fluid-chamber, an annular flange united to the piston spaced in front of and parallel to the transverse wall, a crank united to the inner end of the driving shaft carrying a trunnion with a self-aligning ball-bearing roll mounted thereon to contact and roll between and along the transverse wall and flange adjacent the side walls of the piston during rotation of the driving shaft relative to the piston, the transverse wall and the flange being formed at an angle to the plane of revolution of the crank whereby the piston will be caused to travel longitudinally as the crank revolves with the driving shaft when the ports hereafter mentioned are open, ports leading from one compression chamber to the other, and means for closing the ports to prevent movement of fluid from either chamber to the other thereby causing the piston and housing to revolve with the drive shaft.

8. A hydraulic clutch comprising a cylindrical housing closed at both ends and rigidly united to a co-axial driven shaft, an open-ended cylindrical piston mounted for longitudinal travel therein but secured against rotation relative to the housing having an intermediate transverse wall and an annular flange united to the piston spaced from the transverse wall and parallel thereto, fluid chambers formed on the front and rear sides of the transverse wall bounded on the sides by the side walls of the cylinder and piston and bounded on the ends by the end walls of the cylinder and the intermediate wall of the piston, a driving shaft revolvably mounted in the front end of the housing with its inner end extending into the front chamber, a crank united to the inner end of the driving shaft carrying a roll mounted thereon whereby it may contact and roll upon the transverse wall and the annular flange during the rotation of the driving shaft relative to the piston and rotate the cylinder when the ports hereafter mentioned are closed, the transverse wall and the flange being formed at an angle to the plane of the crank whereby the piston will be caused to travel longitudinally as the crank revolves with the driving shaft.

9. A hydraulic clutch comprising a cylindrical housing closed at both ends and rigidly united to a co-axial driven shaft, an open-ended cylindrical piston mounted for longitudinal travel therein but secured against rotation relative to the housing having an intermediate transverse wall and an annular flange united to the piston spaced from the transverse wall and parallel thereto, fluid-chambers formed on the front and rear sides of the transverse wall bounded on the sides by the side walls of the cylinder and piston and bounded on the ends by the end walls of the cylinder and the intermediate wall of the piston, a driving shaft revolvably mounted in the front chamber, a crank united to the inner end of the driving shaft carrying a roll mounted thereon whereby it may contact and roll upon the transverse wall and the annular flange during the rotation of the driving shaft relative to the piston and rotate the cylinder when the ports are partly opened, at varying speeds more or less proportional to the extent of the opening of the ports, the transverse wall and the flange being formed at an angle to the plane of the crank whereby the piston will be caused to travel longitudinally as the crank revolves with the driving shaft.

10. In a fluid clutch, the combination with a cylindrical housing united to a driven shaft, of an open-ended cylindrical piston mounted therein for longitudinal travel but secured against rotation relative to the housing, a transverse wall formed in the piston to separate front and read fluid-chambers, a driving shaft revolvably mounted in one end of the housing in line axially with the driven shaft and with its inner end extending into the front fluid-chamber, an annular flange formed integral with the piston spaced in front of and parallel to the transverse wall, a crank united to the inner end of the driving shaft carrying a trunnion with a self-aligning ball-bearing roll mounted thereon to contact and roll between and along the transverse wall and flange adjacent the side walls of the piston during rotation of the driving shaft relative to the piston, the transverse wall and the flange being formed at an angle to the plane of revolution of the crank whereby the piston will be caused to travel longitudinally as the crank revolves with the driving shaft, and means to permit, regulate, and shut off flow of fluid from one chamber to the other.

HARRY J. CRINER.